US009975409B2

(12) United States Patent
Hölzel (10) Patent No.: US 9,975,409 B2
(45) Date of Patent: May 22, 2018

(54) ARRANGEMENT WITH A COVER FOR A VEHICLE ROOF (71) Applicant: Webasto SE, Stockdorf (DE)

(72) Inventor: Dominik Hölzel, Olching (DE)

(73) Assignee: WEBASTO SE, Stockdorf (DE)

( * ) Notice: Subject to any disclaimer, the term of this patent is extended or adjusted under 35 U.S.C. 154(b) by 0 days. days.

(21) Appl. No.: 15/307,739

(22) PCT Filed: Apr. 27, 2015

(86) PCT No.: PCT/EP2015/059072
§ 371 (c)(1),
(2) Date: Oct. 28, 2016

(87) PCT Pub. No.: WO2015/172999
PCT Pub. Date: Nov. 19, 2015

(65) Prior Publication Data
US 2017/0113523 A1 Apr. 27, 2017

(30) Foreign Application Priority Data

May 14, 2014 (DE) .................. 10 2014 106 806
Jul. 21, 2014 (DE) .................. 10 2014 110 234

(51) Int. Cl.
B60J 7/04 (2006.01)
B60J 7/02 (2006.01)
B60J 7/043 (2006.01)

(52) U.S. Cl.
CPC ............ B60J 7/022 (2013.01); B60J 7/0435 (2013.01)

(58) Field of Classification Search
CPC ... B60J 7/0435; B60J 7/05; B60J 7/057; B60J 7/047

(Continued)

(56) References Cited

U.S. PATENT DOCUMENTS

| 8,459,730 B2 | 6/2013 | Sawada et al. |
| 8,807,646 B2 | 8/2014 | Grimm et al. |
| 2005/0023868 A1* | 2/2005 | Ettl .................. B60J 7/0435 296/223 |

FOREIGN PATENT DOCUMENTS

| DE | 10 2011 018 151 A1 | 10/2012 |
| DE | 10 2011 015833 A1 | 10/2012 |

(Continued)

OTHER PUBLICATIONS

International Search Report for PCT/EP2015/059072 dated Jul. 20, 2015; English translation submitted herewith (5 Pages).

Primary Examiner — Dennis H Pedder
(74) Attorney, Agent, or Firm — Fitch, Even, Tabin & Flannery LLP (57) ABSTRACT An arrangement with a cover for a vehicle roof. The rear region of said cover can be raised starting from a closed position using deployment means to open the roof opening, and the cover can be moved towards the rear over the vehicle roof into an open position. The deployment means have a slide movable in a guide rail in a vehicle longitudinal direction by means of a drive, said slide comprising a slide gate. The deployment means may further have a gate stationary relative to the guide rail. The deployment means additionally have a deployment rod movable in the vehicle longitudinal direction by means of the slide and which is coupled to the stationary gate by means of a first coupling element and to the slide gate by means of a second coupling element in the closed position of the roof.

9 Claims, 5 Drawing Sheets (58) Field of Classification Search
USPC .......... 296/216.02–216.05, 220.01, 221–223
See application file for complete search history.

(56) References Cited

FOREIGN PATENT DOCUMENTS

| | | |
|---|---|---|
| DE | 10 2012 002299 A1 | 8/2013 |
| EP | 2 017 108 A1 | 1/2009 |
| JP | 2012153336 A | 8/2012 |
| WO | 2006086955 A1 | 8/2006 |

\* cited by examiner

ARRANGEMENT WITH A COVER FOR A VEHICLE ROOF

CROSS-REFERENCE TO RELATED APPLICATIONS

This application is a U.S. national phase application filed under 35 U.S.C. § 371 of International Application No. PCT/EP2015/059072, filed Apr. 27, 2015, designating the United States, which claims priority from German Patent Application Nos. 10 2014 106 806.8 and 10 2014 110 234.7 filed May 14, 2014 and Jul. 21, 2014, respectively, which are hereby incorporated herein by reference in their entirety for all purposes.

FIELD

The invention relates to an arrangement with a cover for a vehicle roof which, starting from a closed position for closing a roof opening, can be raised for opening using deployment means in the rear region thereof and which can be displaced toward the rear into an open position.

BACKGROUND

Such arrangements having a cover for a vehicle roof are known in many forms from the prior art. Typically, during an opening operation of a roof opening, a sliding drive member in the longitudinal direction of the vehicle is displaced toward the rear. In lateral regions of the cover, deployment means are provided in order to raise the cover before it is displaced further to the rear into an open position in order to release the roof opening.

In this instance, in order to raise or deploy the cover using the sliding drive member, there is displaced to the rear in the longitudinal direction of the vehicle a deployment rod which is coupled to the cover by means of a rear deployment lever in the rear region. Subsequently, when the cover has been deployed or raised to the maximum extent, in the event of a further displacement of the sliding member, the deployment rod is locked in the guide rail so that the deployment rod and also the rear deployment lever are locked in the position thereof.

As known from DE 102011015833 A1, in order to lock the deployment rod, there is used a complex locking mechanism which comprises a plurality of components. In particular it comprises filigree components and one or more resilient elements.

An object forming the basis of the invention is to describe an arrangement with a cover for a vehicle roof which is distinguished by a simple structural construction of a locking mechanism.

SUMMARY

According to the invention there is described an arrangement with a cover for a vehicle roof which, starting from a closed position for closing a roof opening, can be raised for opening using deployment means in the rear region thereof and which can be displaced toward the rear over the vehicle roof into an open position. The deployment means have a sliding member which can be displaced in the longitudinal direction of the vehicle by means of a drive in a guide rail and which has a sliding member link. The deployment means further have a link which is fixed relative to the guide rail. Finally, the deployment means have a deployment rod which can be displaced in the longitudinal direction of the vehicle by means of the sliding member and which is coupled in the closed position of the cover by means of a first coupling element to the fixed link and by means of a second coupling element to the sliding member link. The fixed link and the sliding member link extend with respect to the longitudinal direction of the vehicle at least partially in opposing directions so that, starting from the closed position of the cover, when the sliding member is displaced, the deployment rod is initially displaced in order to deploy a rear deployment lever relative to the guide rail and after the deployment is locked in the event of a further displacement of the sliding member.

The displacement of the cover over the vehicle roof means that the cover after lifting or deployment in the region of a rear edge of the cover is pushed over an outer side of the vehicle roof. Preferably, the arrangement is an arrangement for a spoiler roof.

The location indications or directional indications used, such as "rear" or "front", refer to the longitudinal direction of the vehicle. The longitudinal direction of the vehicle may also be referred to as the horizontal direction or X direction. The deployment or lifting of the cover is carried out substantially in a vertical direction or Z direction. A mathematical system of laws is involved. The rear region of the cover is intended, for example, to be understood to be the region which, starting from a center of the cover, faces the rear of the vehicle.

The arrangement makes provision for the deployment rod to be coupled both to the fixed link and to the sliding member link of the sliding member which can also be referred to as a sliding drive member. The fixed link and the sliding member link extend at least partially in opposing directions. In this instance, when the sliding member is displaced starting from the closed position of the cover, the sliding member link first controls a displacement of the deployment rod relative to the guide rail in order to deploy the rear deployment rod and to lift the cover. In this instance, the deployment rod is locked with the sliding member in the X direction by means of the sliding member link. At the same time, when the sliding member is displaced starting from the closed position of the cover by means of the fixed link, a movement of the deployment rod in the X direction is released, whilst a movement in the Z direction is locked. After the deployment, the fixed link controls the fact that, in the event of a further displacement of the sliding member, the deployment rod is locked with respect to the guide rail. At the same time, the sliding member link controls the fact that the deployment rod can be displaced in a relative manner with respect to the sliding member. That is to say, the deployment rod is consequently locked in the X direction in the fixed sliding member link, whilst the X-locking in the sliding member link is cancelled after the deployment. This is brought about in particular by the sliding member link and the fixed link extending at least partially in opposing directions, for example, in a rear region with respect to the longitudinal direction of the vehicle. On the whole, the two links change their locking method in the X direction or Z direction, respectively.

Extending in opposing directions means that, in the closure position of the cover, the path of one link changes in such a manner that a spacing between the cover and the link is decreased, whilst the path of the other link behaves in such a manner that a spacing between the cover and the other link is increased. Preferably, the sliding member link and the fixed link intersect in a projection plane which is orientated to be normal with respect to the Y direction. In particular, they intersect in the state in which the sliding member is located with respect to the longitudinal direction of the vehicle at the height of the fixed link and the changing of the locking method of the two links takes place. A compact embodiment which requires little structural space is thereby enabled.

The arrangement consequently enables a locking mechanism for locking the deployment rod, which mechanism has only very few structural elements or components. In particular, no filigree components and resilient elements are required.

Furthermore, it is not necessary, for example, to introduce any recesses into the guide rail, whereby material costs and production costs can be saved. On the whole, an assembly of the arrangement is also significantly simplified and less time-consuming.

Another advantage becomes evident with the force transmission in which no abrupt load jumps occur. The components mentioned, such as the two links, are also subjected to significantly less wear in comparison with resilient elements and filigree components. Furthermore, in order to lock the deployment rod, it is not bent but instead only displaced. Wear of the deployment rod AS is thereby kept low, wherein, for example, fatigue failure of the deployment rod AS as a result of reverse bending stresses is prevented or at least reduced.

Furthermore, the deployment rod and the coupling elements of the deployment rod are rigidly connected to each other. For example, the coupling elements and the deployment rod are produced in an integral manner. Only a very short tolerance chain is thereby produced for the locking of the deployment rod. A tolerance chain is intended to be understood to refer to the interaction of a plurality of mechanical components, taking into account production-related shaping and/or positional tolerances. The fewer the components which interact in the movement, the fewer the tolerances which have to be compensated for. Additional elements, such as resilient elements or others, would require a greater tolerance chain, which has to be taken into account and compensated for in order to ensure secure locking. As a result of the small tolerance chain, disruptive noises, such as rattling and switching noises, are further prevented.

According to an embodiment of the invention, the fixed link has in the closed position of the cover a path in which a spacing between the fixed link and the cover in the longitudinal direction of the vehicle initially remains the same toward the rear and subsequently changes. The change of spacing is intended in this instance to be understood to be a significant change of the spacing, wherein the path extends in particular in a curved, ramp-like and/or step-like manner. The spacing remaining the same is intended in this instance to be understood to mean that the spacing does not change at all, or only to a very small degree, for example, at a small angle with respect to the longitudinal direction of the vehicle. For example, the spacing with respect to the cover can increase or decrease toward the rear.

According to another embodiment of the invention, in the closed position of the cover the path of the fixed link with respect to the longitudinal direction of the vehicle has toward the rear a front portion in which the spacing between the fixed link and the cover remains the same, and has a rear portion in which the spacing between the fixed link and the cover in the longitudinal direction of the vehicle increases toward the rear. In this instance, the spacing remaining the same or the change of the spacing is intended to be understood in a similar manner to the paragraph above.

Preferably, in the closed position of the cover, the first coupling element is located in the front portion of the fixed link and, in the open position of the cover, in the rear portion of the fixed link.

As a result of such a path of the first link, it is possible that, when the sliding member is displaced, the deployment rod can initially be displaced in a relative manner with respect to the fixed link and consequently in a relative manner with respect to the guide rail, that is to say, is not locked with respect to the fixed link in the X direction. A deployment of the rear lever can thereby be controlled by means of the deployment rod.

According to another embodiment of the invention, the sliding member link has in the closed position of the cover a path in which a spacing between the sliding member link and the cover in the longitudinal direction of the vehicle initially remains the same toward the rear and subsequently changes. The terms changing and remaining the same are in turn intended to be understood in a similar manner to the above case.

According to another embodiment of the invention, in the closed position of the cover, the path of the sliding member link with respect to the longitudinal direction of the vehicle has toward the rear a front portion, in which the spacing between the sliding member link and the cover remains the same, and has a rear portion, in which the spacing between the sliding member link and the cover in the longitudinal direction of the vehicle decreases toward the rear.

Preferably, in the closed position of the cover, the second coupling element is located in the rear portion of the sliding member link and, in an open position of the cover, in the front portion of the sliding member link.

As a result of such a path of the sliding member link, it is possible that, when the link is displaced, the deployment rod is coupled thereto so as not to be able to be displaced with respect to the sliding member and is displaced toward the rear in the longitudinal direction of the vehicle in order to deploy the lever. By means of the fixed link, it is finally controlled that, after the deployment of the rear deployment lever, the second coupling element is guided from the rear portion into the front portion so that the sliding member can be displaced relative to the deployment rod.

According to another embodiment, the deployment rod is lifted when the sliding member is displaced starting from the closed position of the cover in a rear region with respect to the longitudinal direction of the vehicle. That is to say, the cover is raised in a vertical direction or in the Z direction during the deployment. The deployment rod is thereby subjected to a seesaw movement since, at the same time in the front region as a result of the locking with respect to the guide rail, it is subjected to an opposing vertical movement in the Z direction. As a result of this seesaw movement, it is possible for the deployment rod to cover a relatively large path for locking in the Z direction, for example, more than a few millimeters. The deployment rod can thereby be locked securely in the fixed link so as not to be able to be displaced with respect to the guide rail. Furthermore, the locking of the deployment rod does not have to take place in a very tight space. It is thereby possible to avoid filigree components which would additionally produce negative switching noises.

Other embodiments are described in the dependent claims and in the following extensive description of an embodiment with the aid of the appended Figures.

Elements or features having the same construction or function are given the same reference numerals in all the Figures. Elements or features which have already been described using reference numerals are not necessarily provided with reference numerals in all the Figures.

DETAILED DESCRIPTION

Figure 1:
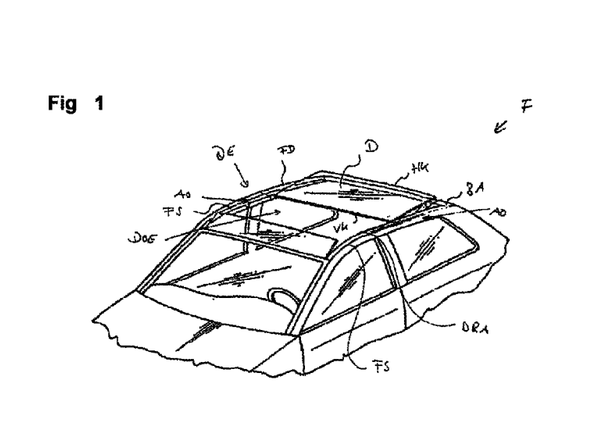
FIG. 1 is a schematic, perspective view of a vehicle.

FIG. 1 is a schematic, perspective view of a vehicle F having a vehicle roof FD. The vehicle roof FD has a securing portion BA which is secured to the vehicle and which is constructed as a roof shell. The securing portion BA which is secured to the vehicle is provided with a roof opening DOE which is selectively closed or at least partially releasable by means of an adjustable movable roof element DE.

The roof opening DOE is delimited by a roof frame portion DRA which is constructed on the vehicle roof FD. The roof frame portion DRA has guide rails FS which are preferably arranged at both sides.

The roof element DE has a cover D and is supported so as to be able to be displaced in relative terms with respect to the guide rails FS in the region of the securing portion BA. In this instance, the roof element DE is displaceably supported by means of a cover carrier and arrangements AO in the guide rails FS. The cover D is preferably constructed as a glass cover.

The arrangements AO which are arranged in the region of the guide rails FS serve to displace the cover D which closes the roof opening DOE of the vehicle roof FD from a closed position into an open position in order to thus release the roof opening DOE of the vehicle roof FD. To this end, the arrangements AO have the deployment means. For opening, the cover D is raised in a rear region and pushed over a rear portion of the vehicle roof FD. To this end, it is necessary for the cover D to be raised since, in the closed position, it terminates flush with the upper side of the vehicle roof FD. During a typical movement sequence, a rear edge HK of the cover D is first deployed. This intermediate position is also referred to as a ventilator position. During the subsequent opening movement, the cover D is displaced in the longitudinal direction of the vehicle toward the rear into the open position.

This typical movement sequence is carried out using the arrangements AO which are described in greater detail with reference to the following FIGS. 2 to 8. In this instance, in these FIGS. 2 to 8, only one arrangement AO is illustrated at one side with the associated mechanism. However, all the components are arranged in a mirror-symmetrical manner with respect to a longitudinal center plane of the vehicle F at both sides of the roof opening DOE. The arrangement AO can also be referred to as a deployment device. It should be noted that FIGS. 2 to 8 illustrate only a cover carrier DT which is securely coupled mechanically to the cover D. Consequently, the cover D is directly coupled to the deployment means and can be moved using them. A displacement of the cover D is accordingly synonymous with a displacement of the cover carrier DT.

Figure 2:
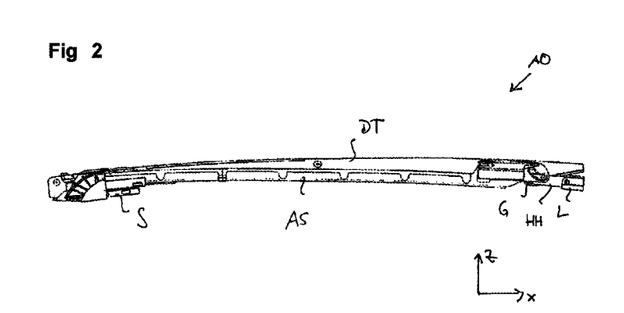
FIG. 2 is a schematic side view of an arrangement with a cover for a vehicle roof of the vehicle.

FIG. 2 is a schematic side view of an arrangement AO. The deployment means of the arrangement AO comprise a sliding member S which can be displaced in a longitudinal direction of the vehicle by means of a drive in a guide rail FS. Furthermore, the deployment means comprise a deployment rod AS, a fixed bearing L and a rear deployment lever HH. The rear deployment lever HH is pivotably connected to a slider G which is displaceably coupled to the cover carrier DT. In FIG. 2, the closed position of the cover D is illustrated.

If, starting from the closed position of the cover D, the sliding member S is displaced, the deployment rod AS is also displaced backward parallel with the longitudinal direction of the vehicle since the deployment rod AS is initially mechanically coupled to the sliding member S. In this instance, the rear deployment lever HH is pivoted with respect to the bearing L so that the cover carrier DT or the cover D is deployed or raised in the region of the rear edge HK. In this deployed state, the cover D is in the ventilator position. If the sliding member S is displaced further toward the rear, the sliding member S is decoupled from the deployment rod AS. This means that the deployment rod AS is no longer locked in the X direction in the sliding member S. At the same time, the deployment rod AS is secured in the region of the front end thereof by means of a locking mechanism in a fixed manner with respect to the guide rail FS. This means that the rear deployment lever HH is also retained in a state locked in the deployed position. In the event of a further displacement of the sliding member S, it also carries the cover carrier DT and pushes the cover carrier DT and consequently the cover D over the vehicle roof FD into the open position. This is possible as described by the rear deployment lever HH being displaceably coupled to the cover carrier G via the slider G.

Figure 3A:
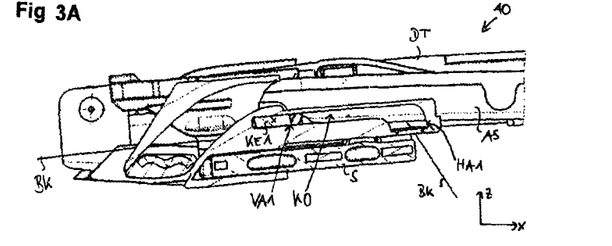
FIGS. 3A and 3B are schematic, enlarged partially sectioned side views of the arrangement in a closed position.
Figure 3B:
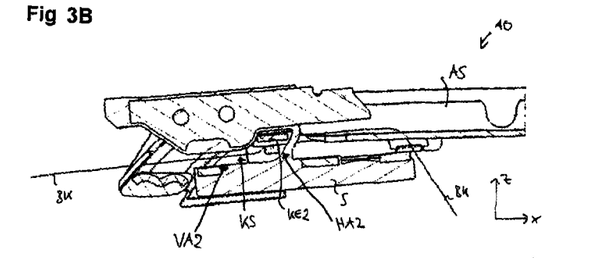
Figure 4A:
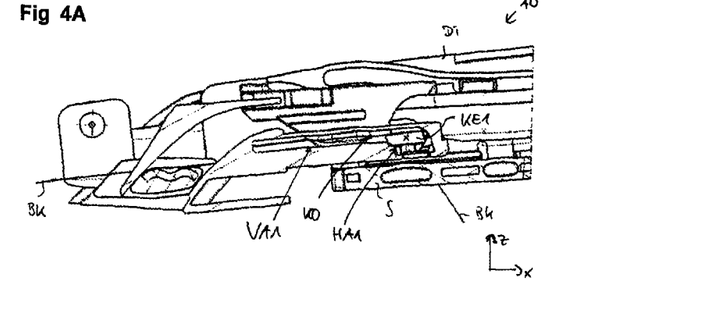
FIGS. 4A and 4B are two schematic, enlarged partially sectioned side views of the arrangement in a ventilator position.
Figure 4B:
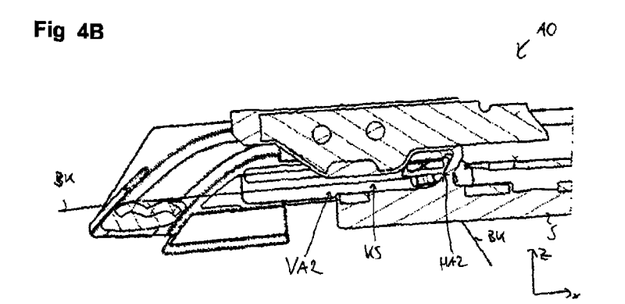
Figure 5A:
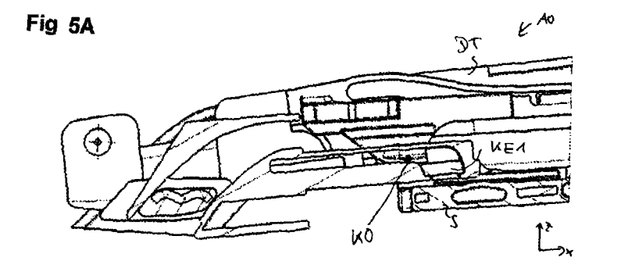
FIGS. 5A and 5B are two second schematic, enlarged partially sectioned side views of the arrangement in the ventilator position.
Figure 5B:
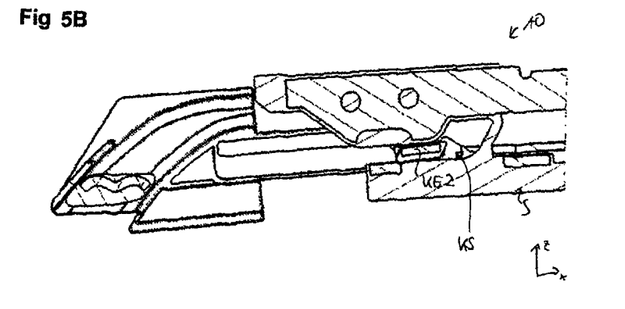

In the following FIGS. 3A to 5B, the deployment means of the arrangement AO in the front region of the cover D are discussed in detail, in particular the locking of the deployment rod AS with respect to the guide rail FS. FIGS. 3A to 5B are divided into pairs of Figures which are indicated by the suffixes "A" and "B". A pair of Figures, for example, 3A and 3B, shows in this instance the arrangement AO in a specific state of the movement sequence described, wherein two different, partially sectioned side views of the arrangement AO are schematically illustrated at the same time. FIGS. 3A and 3B show the arrangement AO in the closed position of the cover D. FIGS. 4A and 4B show the arrangement AO in the ventilator position. FIGS. 5A and 5B show the arrangement AO in another state, wherein the cover D is further located in the ventilator position. The two respective partially sectioned side views of a pair of Figures extend in this instance through two different planes parallel with the image plane of the Figures, wherein, in the Figures which are indicated with the suffix "A", the emphasis is placed on a fixed link KO of the vehicle F and, in the Figures indicated with the suffix "B", on a sliding member link KS of the sliding member S. All the FIGS. 3A to 5B have in common the fact that they illustrate a front end of the deployment rod AS or a front edge VK of the cover D (see FIG. 1).

As already mentioned, the arrangement AO has a sliding member S. The sliding member S has a sliding member link KS. The arrangement AO further has a fixed link KO. The fixed link KO is in this instance fixed with respect to the guide rail FS. The deployment rod AS has a first coupling element KE1 and a second coupling element KE2 which are arranged at opposing sides of the deployment rod AS. The two coupling elements KE1 and KE2 are constructed as sliding elements. The coupling elements KE2 and KE2 are optionally constructed integrally with the deployment rod AS.

By means of the first coupling element KE1, the deployment rod AS is guided in the closed position of the cover D in the fixed link KO. The fixed link KO has a front portion VA1 and a rear portion HA1. The front portion VA1 has a path in which in the closed position of the cover D a spacing between the fixed link KO and the cover D substantially does not change. The rear portion HA1 of the fixed link KO has a path in which the spacing between the cover D and the fixed link KO in the longitudinal direction of the vehicle increases toward the rear.

By means of the second coupling element KE2, the deployment rod AS is guided in the closed position of the cover D in the sliding member link KS. The sliding member link KS has a path in which, in the closed position of the cover D in a front portion VA2, the spacing between the cover and the sliding member link KS does not change or remains the same. In a rear portion HA2 of the sliding member link KS, the sliding member link KS has a path in which the spacing between the cover and the sliding member link KS is reduced.

The spacing between the cover D and the respective link KS or KO relates in this instance to a trajectory BK of the respective link KS or KO, as indicated, for example, in FIG. 3B. The trajectories BK are intended to be understood in this case to be schematic and provide only limited information relating to an actual length or configuration of the links KS or KO, respectively.

In the closed position of the cover D, the first coupling element KE1 is in the front portion VA1 of the fixed link KO (see FIG. 3A). The second coupling element KE2 of the deployment rod AS is located in the rear portion HA2 of the sliding member link KS (see FIG. 3B). Consequently, the deployment rod AS is locked or guided by means of the fixed link KO and the first coupling element KE1 in the Z direction. In contrast, a movement of the deployment rod AS with respect to the fixed link KO in the longitudinal direction of the vehicle or X direction is released. This situation is reversed with the sliding member link KS of the sliding member S, wherein the deployment rod is locked by means of the second coupling element KE2 in the X direction, whilst a Z movement is released.

If the sliding member S is now displaced toward the rear in the longitudinal direction of the vehicle, it also carries the deployment rod AS in the longitudinal direction of the vehicle toward the rear. This is a result of the fact that the deployment rod is locked by means of the second coupling element KE2 in the sliding member link KS in the X direction, whilst a movement of the deployment rod AS parallel with the longitudinal direction of the vehicle is released by means of the fixed link KO.

If the sliding member S is displaced further backward, the state of the arrangement AO shown in FIGS. 4A and 4B is achieved. As a result of the paths which extend in opposing directions in the rear region or in the rear portions HA1 and HA2 of the fixed link KO or sliding member link KS, a so-called transfer of the two coupling elements KE1 and KE2 is achieved, wherein the two sliding member links KO and KS change their locking directions. In this instance, as a result of the guiding of the fixed link KO in the Z direction, the first coupling element KE1 is guided into the rear portion HA2 of the fixed link KO, whilst the second coupling element KE2 is moved out of the rear portion HA2 of the sliding member link KS into the front portion VA2 of the sliding member link KS. The cover D is consequently located at least partially in the ventilator position.

If the sliding member S is now displaced further, the state shown in FIGS. 5A and 5B is achieved, wherein the first coupling element KE1 is now located completely in the rear portion HA1 of the fixed link KO. Consequently, the deployment rod AS is locked by means of the first coupling element KE1 in the fixed link KO in the X direction. At the same time, by means of the sliding member link KS, a movement in the X direction is released. In the Z direction, the deployment rod AS is now guided by means of the second coupling element KE2 in the sliding member link KS.

With a further displacement of the sliding member S, the deployment rod AS leaves by means of the second coupling element KE2 the sliding member link KS and consequently the sliding member S. In this instance, additional mechanisms and/or elements which are not described in greater detail may optionally be provided in order to retain the deployment rod AS in the locked position.

In the state shown in FIGS. 5A and 5B, the rear deployment lever HH is deployed by means of the deployment rod AS. The deployment is described again below in FIGS. 6 to 8. With a further displacement of the sliding member S, the cover D or the cover carrier DT is displaced further toward the rear over the vehicle roof FD into the open position. In this instance, the deployment rod AS and the rear deployment lever HH are locked in their position.

By means of the described arrangement AO, it is possible in a simple manner to actuate the deployment rod AS to deploy the rear deployment lever HH and after deployment of the cover D to lock it in a fixed manner with respect to the guide rail FS. In this instance, only two links KO and KS are required. Advantageously, no additional components, such as filigree components, resilient elements or the like, are required. By means of the movement sequence described, a good force transmission and introduction of force can be achieved. Furthermore, there is substantially more free space available for decoupling the deployment rod AS from the sliding member S or for locking the deployment rod AS in the X direction. Furthermore, the switching reliability is improved and the production of noises is at least reduced.

As described with reference to FIGS. 6 to 8, by means of the provision of a specific optional movement path of the deployment rod AS in the rear region of the cover D in order to deploy the rear deployment lever HH, an additional advantageous action or effect can be achieved. In this instance, the state of the arrangement AO shown in FIG. 6 corresponds to the state shown in FIGS. 3A and 3B. The state shown in FIG. 7 is located during the displacement of the sliding member S between the state shown in FIGS. 3A and 3B and the state shown in FIGS. 4A and 4B. The state of the arrangement AO shown in FIG. 8 corresponds to the states shown in FIGS. 4A to 5B.

The rear deployment lever HH is pivotably coupled with respect to a first pivot axis SA1 to the fixed bearing L. Furthermore, the rear deployment lever HH is pivotably coupled with respect to a second pivot axis SA2 to the slider G which is guided so as to be able to be displaced in a relative manner on the cover carrier DT.

The deployment rod AS has at the rear end thereof a first link K1. This is in engagement with a coupling element KE3 of the rear deployment lever HH. In the closed position of the cover D, the first link K1 has a path in which a spacing between the first link K1 and the cover D in the longitudinal direction of the vehicle initially changes toward the rear and subsequently remains the same. To this end, the path of the first link K1 has a front portion VA3 which extends substantially in a vertical manner. Furthermore, the path of the first link K1 has a central portion MA3 in which the spacing between the first link K1 and the cover D increases toward the rear. In addition, the path of the first link K1 has a rear portion HA3 in which the spacing between the first link K1 and the cover D remains the same. In the closed position of the cover D, the coupling element KE3 of the rear deployment lever HH is located in the rear portion HA3.

Figure 6:
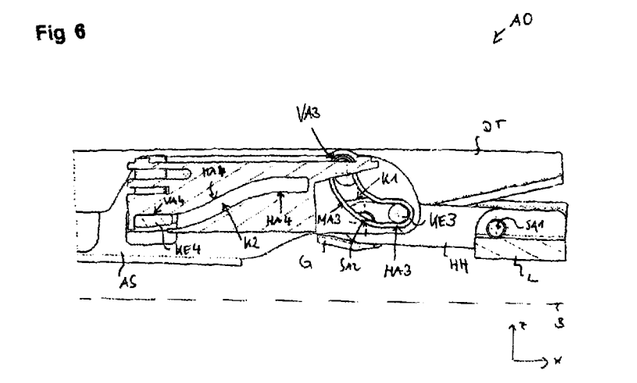
FIG. 6 is a schematic, enlarged partially sectioned side view of the arrangement in a rear region in a closed position.
Figure 7:
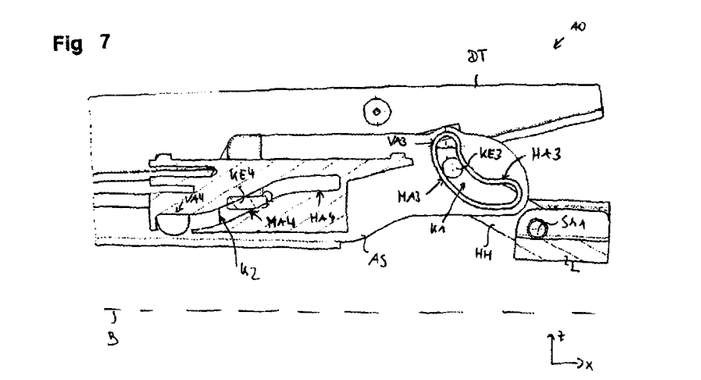
FIG. 7 is a schematic, enlarged partially sectioned side view of the arrangement in the rear region in a partial ventilator position

As can be seen in FIG. 6, the fixed bearing L of the arrangement AO is arranged in such a manner that the first pivot axis SA1 of the fixed bearing L is located above a base B of the guide rail FS indicated with broken lines. A base B of the guide rail FS is intended in this instance to be understood to be a plane normal with respect to the image plane of FIGS. 6 to 8, which plane extends substantially tangentially to the vehicle roof FD or parallel with the longitudinal direction of the vehicle below the sliding member S and has the largest spacing with respect to the cover D in the closed position. As mentioned, the sliding member S is displaceably arranged in the guide rail FS, wherein the guide rail FS extends substantially parallel with the longitudinal direction of the vehicle. The guide rail FS substantially comprises a C-profile which is open in an upward direction, that is to say, in a direction facing the cover D in the Z direction, and inside which the sliding member S is guided.

The deployment rod AS has a coupling element KE4 by means of which the deployment rod AS is guided in a second link K2 which is fixed with respect to the guide rail FS. The second link K2 has in the closed position of the cover D a path with a front portion VA4 in which a spacing between the second link K2 and the cover D remains the same. The second link K2 has a central portion MA4 in which a spacing between the second link K2 and the cover D decreases toward the rear in the longitudinal direction of the vehicle. Finally, the second link K2 has a rear portion HA4 in which a spacing between the second link K2 and the cover D remains the same. In the closed position of the cover D, the coupling element KE4 of the deployment rod AS is located in the front portion VA4 of the second link K2.

If the sliding member S is now displaced toward the rear in the opening direction, that is to say, in the X direction by means of the drive, the deployment rod AS as a result of the mechanical coupling with respect to the sliding member S is displaced toward the rear as described. In this instance, the coupling element KE4 of the deployment rod AS moves in the direction of the central portion MA4 of the second link K2. The rear deployment lever HH is initially not changed in terms of its position, that is to say, not pivoted about the pivot axis SA1 of the fixed bearing L. Instead, the deployment rod AS is displaced relative to the rear deployment lever HH in the X direction, wherein the coupling element KE3 of the rear deployment lever HH is guided in the first link K1 in the direction of the central portion MA3. As soon as the coupling element KE3 is located in the central portion MA3 of the first link K1, as a result of the movement of the sliding member S the rear deployment lever HH is pivoted about the pivot axis SA1, whereby the cover carrier DT is raised in the region of the rear edge HK thereof. At the same time, the deployment rod AS is raised by means of the second link K2 above the coupling element KE4 so that it carries out a vertical movement in the Z direction in addition to the horizontal movement in the X direction. The cover carrier DT and consequently the cover D are now at least partially deployed. This is illustrated in FIG. 7.

If the sliding member S is now displaced further toward the rear in the guide rail FS, the coupling element KE4 of the deployment rod AS is guided in the second link K2 into the rear portion HA4 and the coupling element KE3 of the rear deployment lever HH is located in the front portion VA3 of the first link K1. In this instance, the cover D reaches its maximum deployed position (see FIG. 8).

Figure 8:
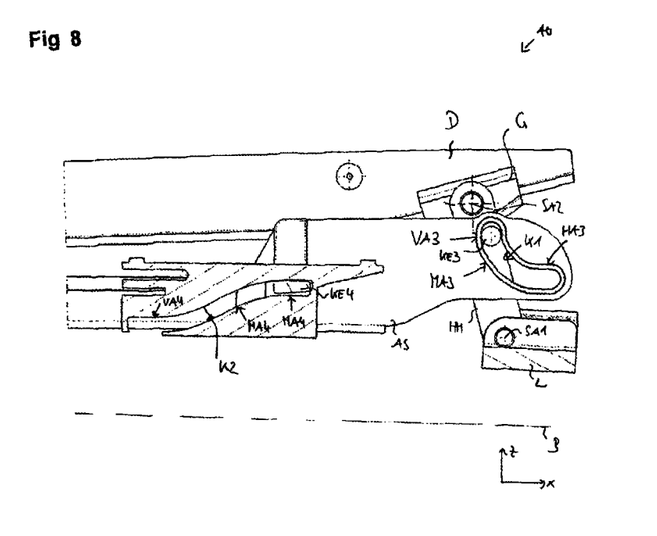
FIG. 8 is a schematic, enlarged partially sectioned side view of the arrangement in the rear region in the ventilator position.

As can further be seen in FIG. 8, during the deployment operation the deployment rod AS has overrun the fixed bearing L in the region of the rear end HE thereof in which the first link K1 is also arranged. In particular, the deployment rod AS has overrun a plane which is defined by the two pivot axes SA1 and SA2 in the closed position of the cover D (see FIG. 6).

This means that the deployment rod AS has been raised using the second link K2 in a vertical direction in such a manner that it is located in the Z direction above the bearing L. This is necessary so that the deployment rod AS does not collide with the bearing L when the rear deployment lever HH is deployed. As a result of the arrangement of the bearing L above the base B of the guide rail FS, as described above, a considerable amount of structural space can be saved which, inter alia, leads to more head freedom being able to be provided in a vehicle.

If the sliding member S is displaced further in the guide rail VS, starting from the ventilator position shown in FIG. 8, the deployment rod AS, as described with reference to FIGS. 3A to 5A, is locked in a fixed manner with respect to the guide rail VS by means of the locking mechanism and is decoupled from the sliding member S.

By means of the shown embodiment of the arrangement AO in the rear region, it is possible for the deployment rod AS to carry out at the rear end thereof a vertical movement in the image plane in an upward direction. At the same time, the deployment rod AS, as described with reference to FIGS. 3A to 5B, carries out at the front end thereof a vertical movement in the opposite direction, that is to say, in a downward direction in the image plane. The deployment rod AS thereby carries out on the whole during the displacement of the sliding member S for deployment of the rear deployment lever HH a seesaw movement which, in order to lock the deployment rod AS in accordance with FIGS. 3A to 5B, leads to the deployment rod AS performing a particularly large lifting action in a vertical direction. A level of safety for locking the deployment rod AS with respect to the guide rail FS can thereby be increased since it is not pivoted only by a few millimeters in a vertical direction. If the deployment rod AS were to be displaced substantially parallel with the longitudinal direction of the vehicle or with respect to the roof panel, and not carry out any vertical movement in an upward direction at the rear end thereof, the deployment rod AS could not carry out such a large lifting action in the Z direction at the front end thereof, but instead only a small vertical movement downward in the image plane.

Another advantage of the arrangement AO both in the front region for locking the deployment rod AS is that no switching noises are produced since no resilient elements or catch mechanisms are provided.

The invention claimed is:

1. An arrangement with a cover for a vehicle roof which, starting from a closed position for closing a roof opening, can be raised for opening using deployment means in the rear region thereof and which can be displaced toward the rear over the vehicle roof into an open position, wherein the deployment means
 have a sliding member which can be displaced in the longitudinal direction of the vehicle by means of a drive in a guide rail and which has a sliding member link;
 have a link which is fixed relative to the guide rail; and
 have a deployment rod which can be displaced in the longitudinal direction of the vehicle by means of the sliding member and which is coupled in the closed position of the cover by means of a first coupling element to the fixed link and by means of a second coupling element to the sliding member link;
 wherein:
 the fixed link and the sliding member link extend with respect to the longitudinal direction of the vehicle at least partially in opposing directions so that, starting from the closed position of the cover, when the sliding member is displaced, the deployment rod is initially displaced in order to deploy a rear deployment lever relative to the guide rail and after the deployment is locked in the event of a further displacement of the sliding member.

2. The arrangement according to claim 1, wherein the fixed link has in the closed position of the cover a path in which a spacing between the fixed link and the cover in the longitudinal direction of the vehicle initially remains the same toward the rear and subsequently changes.

3. The arrangement according to claim 2, wherein in the closed position of the cover the path of the fixed link with respect to the longitudinal direction of the vehicle has toward the rear a first front portion (VA1) in which the spacing between the fixed link remains the same, and has a rear portion in which the spacing between the fixed link and the cover in the longitudinal direction of the vehicle increases toward the rear.

4. The arrangement according to claim 3, wherein, in the closed position of the cover, the first coupling element is located in the first front portion of the fixed link and, in the open position of the cover, in the rear portion of the fixed link.

5. The arrangement according to claim 1, wherein the sliding member link (KS) has in the closed position of the cover a path in which a spacing between the sliding member link and the cover in the longitudinal direction of the vehicle initially remains the same toward the rear and subsequently changes.

6. The arrangement according to claim 5, wherein, in the closed position of the cover, the path of the sliding member link with respect to the longitudinal direction of the vehicle has toward the rear a second front portion, in which the spacing between the sliding member link and the cover remains the same, and has a second rear portion, in which the spacing between the sliding member link and the cover in the longitudinal direction of the vehicle decreases toward the rear.

7. The arrangement according to claim 6, wherein, in the closed position of the cover, the second coupling element is located in the second rear portion of the sliding member link and in the ventilator position of the cover in the second front portion of the sliding member link.

8. The arrangement according to claim 1, wherein the deployment rod is lifted when the sliding member is displaced starting from the closed position of the cover in a rear region with respect to the longitudinal direction of the vehicle.

9. The arrangement according to claim 1, wherein the first and second coupling elements are constructed as sliders.

* * * * *